United States Patent

George

[15] 3,646,325

[45] Feb. 29, 1972

[54] DOCUMENT READER FOR READING DATA ON BOTH SIDES OF A DOCUMENT

[72] Inventor: Richard Willis George, Iowa City, Iowa

[73] Assignee: Westinghouse Learning Corporation

[22] Filed: Nov. 21, 1969

[21] Appl. No.: 878,739

[52] U.S. Cl. ..................235/61.11 R, 101/230, 235/61.11 E, 250/219 D, 271/DIG. 9, 346/74 M

[51] Int. Cl. ....................B41f 5/02, G06k 7/14, G01n 21/30, G06k 13/07, G01d 15/28

[58] Field of Search ................271/DIG. 9; 101/230; 346/74; 235/61.11, 61.115, 61.12; 250/219 D

[56] References Cited

UNITED STATES PATENTS

| | | | |
|---|---|---|---|
| 332,519 | 12/1885 | Hawkins | 101/230 |
| 2,765,735 | 10/1956 | Daly | 101/230 |
| 2,868,115 | 1/1959 | Gollwitzer | 101/2 |
| 3,070,204 | 12/1962 | Bradshaw | 271/DIG. 9 |
| 3,114,150 | 12/1963 | Calano | 346/74 |
| 3,227,444 | 1/1966 | Egan | 235/61.11 |

*Primary Examiner*—Maynard R. Wilbur
*Assistant Examiner*—Robert M. Kilgore
*Attorney*—Haven E. Simmons and James C. Nemmers

[57] ABSTRACT

An arrangement for handling at high speeds documents both sides of which must be machine "read" or "scanned" in order to record the data contained thereon. The mechanism of the invention allows both sides of the document to be scanned by a single reading head by inverting the document and passing it by the head a second time immediately after one side has been read the path of the second passing not crossing the path followed by the document for the first reading.

5 Claims, 5 Drawing Figures

INVENTOR.
RICHARD WILLIS GEORGE
BY James C. Nemmers
ATTORNEY

INVENTOR.
RICHARD WILLIS GEORGE
BY
ATTORNEY

INVENTOR.

RICHARD WILLIS GEORGE

BY James C. Nemmers

ATTORNEY

DOCUMENT READER FOR READING DATA ON BOTH SIDES OF A DOCUMENT

BACKGROUND OF THE INVENTION

For many years, and increasingly in recent years, cards, sheets and other documents have been used to record data in a wide variety of applications. For example, punched cards are used in many personnel and accounting applications, and sheets for recording answers to a wide variety of tests are also becoming more extensively used. If the data contained on such cards and documents had to be manually read, the task would not only be a tedious one but in some applications, this would require so much time as to render use of the systems employing such documents impractical. Thus, there have been developed machines which will "read" these cards and other documents and transmit the data so obtained onto magnetic tape or other storage means from where it can be subsequently utilized in the desired manner. With the volume of documents often handled by such machines, speed of reading is important. Furthermore, in many instances, it is both more efficient and less costly to record data on both sides of a document. In order to obtain the information from a document containing data on both sides, machines have been developed which will read both sides of the document simultaneously. Such machines utilize two reading or scan heads and duplicate associated circuitry which will convert the data "read" by the scan heads into usable signals. Since such machines are reading data from both sides simultaneously, they must have relatively complex circuitry that will coordinate transmission of the signals received from the two scan heads so that the two signals will be properly transmitted without interference between them. There is another known method of reading data from documents which have data recorded on both sides. This method utilizes a single reading head but requires the documents all to be passed completely through the machine twice. This method requires proper and accurate correlation between the data obtained from the first pass and that read on the second pass so that the information obtained from the two passes is properly related to the correct document. This latter method is also relatively slow and requires constant supervision by an operator who must stop the machine after the first pass, remove the documents from the output hopper and return them to the input hopper for the second pass. The first described method utilizing dual reading heads is more efficient and requires less supervision, but it is also quite expensive due to the duplication of components for the two reading circuits and also because of the circuitry necessary to properly synchronize the output signals from the reading heads.

SUMMARY OF THE INVENTION

In a document reader constructed according to the principles of the invention, there is only one reading head. However, the documents can be read on both sides while making only a single pass through the machine. Dual reading with a single pass is accomplished by providing means for returning the documents to the reading head in an inverted position immediately after one side has been scanned. Thus, both sides of each document are read consecutively before the next document is passed beneath the reading head. The invention further provides an arrangement whereby the document can be returned to the reading head immediately for a second pass in the event that an error in reading is detected. Because a single reading head is used, a document reader can, therefore, be constructed at a relatively low cost which will read both sides of a document consecutively and, thus, eliminate the necessity of passing the entire group of documents through the machine a second time.

BRIEF DESCRIPTION OF THE DRAWINGS

FIG. 2 is a plan view of another embodiment of the invention designed primarily to handle sheets rather than cards.

The objects, features, and advantages of the invention will become readily apparent from the description contained herein taken in connection with these drawings.

DESCRIPTION OF THE PREFERRED EMBODIMENT

Figure 1:
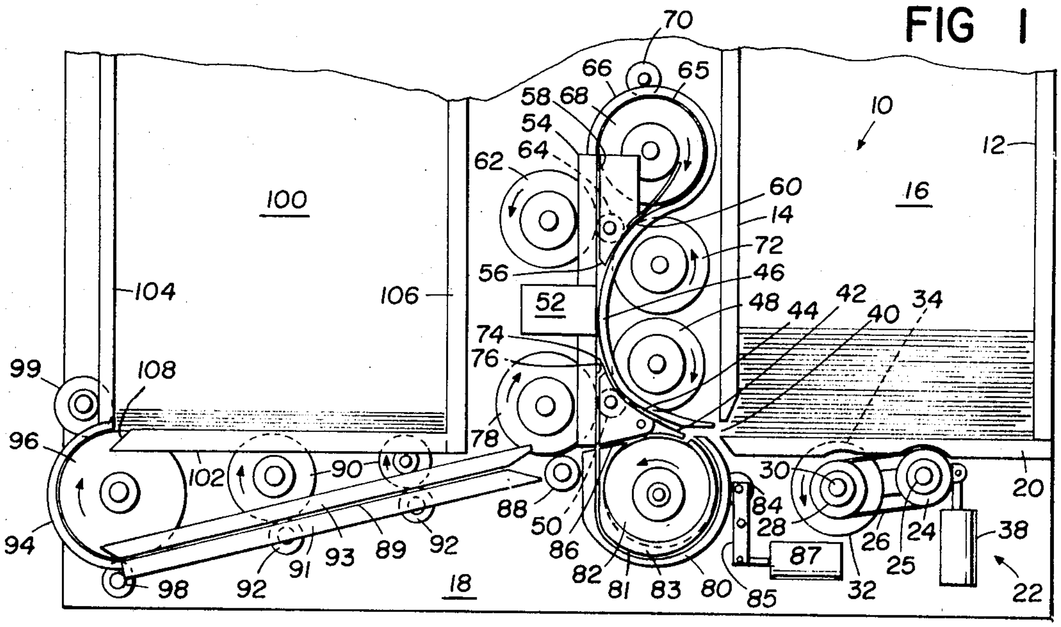
FIG. 1 is a plan view of a portion of a document reader incorporating the principles of the invention and designed primarily as a card reader.
Figure 5:
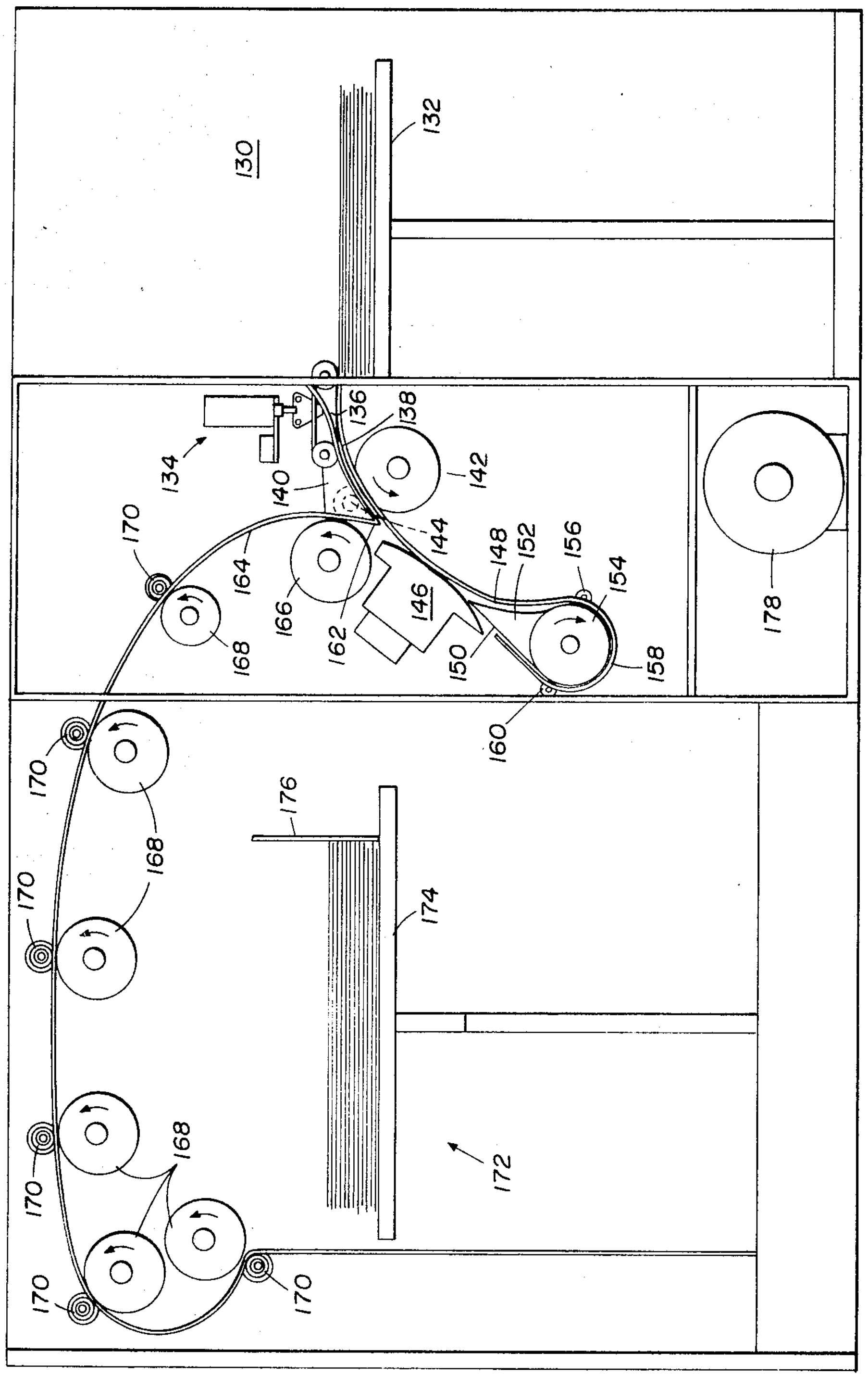

In FIG. 1 there is illustrated the essential components of an apparatus which incorporates the principles of the invention. The apparatus shown is for handling rectangular cards, but obviously, the apparatus could be modified to handle documents which are considerably larger than the cards and of almost any size within reasonable limits. For example, such an apparatus for handling sheets is illustrated in FIG. 5 and will be described hereinafter. The documents to be read are stacked in the input hopper 10 which consists essentially of a pair of side guide rails 12 and 14 that extend transversely of the back support 16 which is preferably a part of the main supporting table 18 for the entire apparatus. The table 18, and thus the back support 16, is preferably inclined between the horizontal and vertical so that the documents will, by force of gravity or by mechanical means aiding gravity, move downwardly toward the bottom support 20. If desired, a weighted member (not shown) may be placed upon the top of the document stack so as to add additional force to assure that the documents will always rest tightly against the bottom support 20. Also, the side guide rails 12 and 14 may be adjustably mounted on the base 16, in any suitable manner so as to be movable toward and away from each other in order to accommodate documents of various sizes. This gravity feed arrangement eliminates the necessity of the more complex feed arrangements where the documents are fed into the apparatus from the top of the stack.

Figure 3:
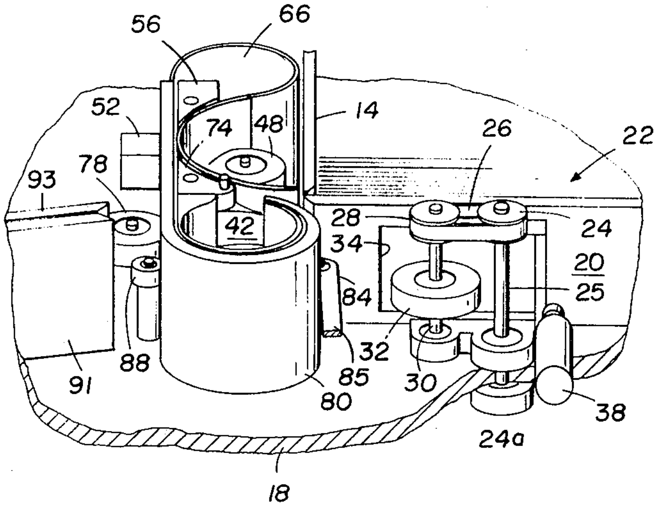
FIG. 3 is a perspective view of a portion of the apparatus and showing in more detail those portions of the document-handling mechanism for feeding the documents and controlling the discharge.
Figure 4:
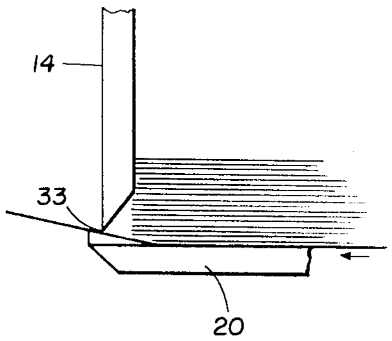
FIG. 4 is an enlarged view of the input area and showing the method of retarding documents from the input hopper.

Mounted beneath the bottom support 20 is an input feed mechanism indicated generally by the reference numeral 22. The feed mechanism 22 consists of a first driven member 24 rotatable about shaft 25 which is driven by a power source as more fully described hereinafter. As best seen in FIG. 3, the first driven member 24 is connected by belt 26 to the second driven member 28 that is rotatable about a shaft 30 to which there is affixed wheel 32. The periphery of wheel 32 is preferably of a high friction material and it extends through an opening 34 in the bottom support 20 so as to be engageable with the bottom document of the stack resting on support 20. The wheel 32 is continuously driven, as will appear from the description of the drive mechanism hereinafter. As the wheel 32 rotates, it engages the document on the bottom of the document stack and moves it rapidly to the left through the opening 33 (FIG. 4) between the bottom edge of the guide rail 14 and the top surface of the support 20 which is preferably inclined as shown in FIG. 4.

Because the opening 33 is extremely small and the bottom edge of guide rail 14 presents a knife edge to the leading edge of the document, only a single document will be fed into the machine. Particularly when handling cards, feeding of the documents one at a time is assured. At high speeds, the document will, therefore, be "shot" out of the input hopper 10. As a document becomes disengaged from input wheel 32, the next document in the input stack will be engaged and similarly discharged from the hopper 10. In order to control the feeding of the document resting in the input hopper 10, the entire input feed mechanism 22 is pivotally mounted on shaft 25 which extends through the table 18. The feed mechanism 22 is thereby movable a sufficient amount to either engage or disengage wheel 32 from the bottom document in the input hopper 10. Movement of the input feed mechanism 22, and thus control of the feeding of the documents, is controlled by a voice coil solenoid 38 which receives its control signals from a control source such as a computer (not shown).

With the input feed arrangement which has been described, documents can be placed into the input hopper 10 and fed one by one at a selected speed and at selected intervals into the document reading portion of the apparatus. Because the documents are normally traveling at a very high rate of speed, and because the individual documents have very little inherent strength or rigidity and sometimes are wrinkled, they must be guided precisely along the desired path. At the input 40 to the document reading portion of the apparatus the path is relatively wide to assure entry of the documents discharged from the input hopper 10. Immediately beyond the input 40 is a pivotally mounted gate 42 which is movable for a purpose that will be more fully explained hereinafter. However, when gate 42 is in the feed position, a document entering the input area 40 will strike the upper surface of gate 42 and will be deflected and guided along an input path 44 that is defined by the curved main guide member 46 which is centrally located within the reading portion of the apparatus. Before a document introduced into input path 44 leaves the control of the feed wheel 32, it will be engaged between a drive wheel 48 and its corresponding idler 50. A reading head 52 is mounted on a supporting member 54 along the input path 44. The supporting member 54 presents a flat surface to a document traveling by reading head 52 so that the document will not be distorted during the time it is being read. As the leading edge of a document traveling in input path 44 approaches the reading head 52, it will strike the flat surface presented by the supporting member 54. At this time, the document is still under the control of drive wheel 48 which will continue to move the document beneath the reading head 52. As the leading edge of the document passes beyond the reading head 52, its trailing edge will still be within the curved input path 44 and because of a certain amount of inherent flexibility of the document it will be biased against the flat surface of the supporting member 54. Just beyond the reading head 52, a path divider 56 presents to the moving document the junction of two paths, a straight path 58 which continues along the flat surface of the supporting member 54 and a secondary input path 60 which is a curved path that curves away from the member 54. The shape of the path divider 56 is such that a slightly wider path is presented to the document at the entrance to the straight path 58, and because the document is biased against the flat surface of the supporting member 54, it will easily enter the straight path 58, still being moved under the control of the drive wheel 48. As the moving document leaves the control of the drive wheel 48, it will be engaged by the drive wheel 62 and its corresponding idler 64 and conveyed along the reminder of the path 58. As the leading edge of the document leaves the straight path 58, it will enter a curved path 65 defined by the turnover plate 66. As the document enters the curved path 65, it will become engaged by the large drive wheel 68 and an idler 70 which will convey the document around path 65 and into the secondary input path 60 which, as previously mentioned, joins with path 58. As best seen in FIG. 1, the drive wheel 68 is located centrally of the path 65 and controls movement of a document through said path and into the secondary input path 60. As a document enters path 60, it is engaged by drive wheel 72 and idler 64, which is the idler also for drive wheel 62. As the leading edge of a document continues its movement and leaves the secondary input path 60, it will again enter the area beneath the reading head 52. Because of the curvature of the path 60, the document will be biased against the flat surface of the supporting member 54. This will again assure close contact with the flat surface so that the document will be held as close as possible to the reading head 52. After traveling around the path 65 formed by the turnover plate 66, the document is inverted from the position when it first passed beneath the reading head 52, and thus the other side of the document will be presented to the reading head 52 for scanning.

As the leading edge of the document passes beyond reading head 52, path divider 74 will be presented to it at the junction of the input path 44 and the discharge path 76. Because of the shape of the path divider 74, a slightly wider path is presented to the document at the entrance to discharge path 76. Moreover, because the document is biased against the flat surface of the supporting member 54, the document will easily enter the discharge path 76. As the document leaves the control of the drive wheel 72, it will be engaged by the drive wheel 78 and idler 50, the latter being also the idler for drive wheel 48. When a document leaves the output path 76, still under the positive control of drive wheel 78, it will then enter a curved path 81 defined by the second turnover plate 80 and inner circular guide plate 83. The document will travel around the path 81 and thereby become again inverted to its original position. Near the end of path 81, the document will leave the influence of the drive wheel 78 and idler 50 but will not yet be engaged by drive wheel 82, the outer surface of which extends through an opening (not shown) in the guide plate 83.

The document will thus momentarily come to rest in order to allow time for the decision to be made whether or not to recirculate the document past the reading head. In some applications where this apparatus is used, this decision may take several seconds while in other applications no period of document rest may be necessary. However, to provide for the brief period of time, if needed, the idler 84 is rotatably mounted on one end of an arm 85 that is pivotally mounted on the table 18. The opposite end of arm 85 is connected to the operating arm of a voice coil solenoid 87 similar to the solenoid 38. The signal controlling solenoid 87 simultaneously controls the position of gate 42 so that if the document is to be recirculated past the reading head 52, the gate 42 will be moved clockwise (FIG. 1) and the idler 84 moved by solenoid 87 against drive wheel 82. If a document is at rest in path 81, movement of the idler 84 will force the leading edge of the document against drive wheel 82 which will drive the document into the input path 44. If the document is not to be recirculated, the gate 42 will be moved counterclockwise (FIG. 1) and the movement of idler 84 toward drive wheel 82 will cause the document to be driven into the final discharge path 86. Obviously, if the particular use of the apparatus does not require a momentary period of rest to give time for the recirculation decision to be made, the idler 84 can be positioned against the drive wheel 82 at all times and the gate 42 moved from the recirculate to the discharge position by an appropriately timed signal. In such applications, the document will be driven nonstop into either the discharge path 86 or the input path 44.

If the gate 42 is in the upper or discharge position, as shown in FIG. 1, the document will be driven into the final discharge path 86, as previously described. As the leading edge of the document becomes disengaged from the drive wheel 82, it will become engaged again by drive wheel 78 and idler 88 thus conveying the document along a straight output path 89 defined by the parallel plates 91 and 93. A pair of drive wheels 90 and idlers 92 will maintain the speed of the document and exert positive control over it while in path 89 and until it engages an inverter plate 94 at which time drive wheel 96 and idlers 98 and 99 will move the document along an inversion path and into the output hopper indicated generally by the reference numeral 100. Inverting the documents again at this point is necessary in order to maintain the order of the documents as they originally were in the input hopper 10. Otherwise, the documents would be in a reverse order which is generally undesirable. In the output hopper 100, the documents are supported upon a fixed support 102, and the stack will be maintained by the side guide rails 104 and 106. When a document enters the output hopper 100, it will be conveyed beneath the documents already in the hopper 100 thus raising the stack slightly. This arrangement eliminates the necessity for having a stack support that is movable in response to an increase in the stack size, the latter arrangement being relatively complex. Entry of a document beneath the existing stack is facilitated by the beveled edge 108 at the input end of the bottom support plate 102.

The path of a document will normally follow the usual path in which a document is first passed beneath the reading head, inverted, again passed beneath the reading head, and then discharged from the reading mechanism, and once again inverted in order to maintain it in its original order relative to the rest of the documents. However, as previously indicated, there may be occasions when it becomes necessary or desirable to return a document to the document reading portion of the apparatus a second time while maintaining its relative order in the stack. Where this is desirable or necessary, and no rest period is required for the recirculate decision, the gate 42 can be moved from the discharge to the recirculate position so that a document traveling through the second turnover path 81 will be driven nonstop back into the input path 44 rather than into the final discharge path 86. To achieve this, the gate 42 can be controlled in any suitable manner so as to be moved from its normal, single pass position to the recirculate position upon receipt of a signal from a suitable control means such as computer (not shown). The specific manner in which gate 42 is moved by a controller forms no part of the invention. One situation in which it might be desirable to recirculate a document would be if the reading head 52 discovered that it made a reading error and transmitted an error indication to the control means. A signal to recirculate would then be immediately sent to the gate controller to move the gate to a recirculate position. Of course, if the document is to be driven nonstop, the error indication and the signal to the gate controller would have to occur within the time the document is in the path 81. If the signal cannot be given in this time, the idler 84 will have to be moved away from the drive wheel 82 as previously described.

This recirculation feature of the invention thus allows a document which has been once read on both sides to be reread on both sides, and this feature can be utilized on document readers with either one or two reading heads. As is well known to those skilled in the art, error detection systems are often built into document readers, but, normally the error is detected, noted, and then the document must be manually removed from the output stack and either manually read or removed and recirculated separately through the reading mechanism, The invention permits the document to be immediately reread without disturbing its order in the stack and thus eliminates, in many instances, the necessity of further manual handling of the document. This mechanical recirculation feature can also be used in place of an electronic buffer. It essentially turns a mark-sense document into a memory device similar to that of a revolving drum storage unit in electronic computing systems.

Figure 2:
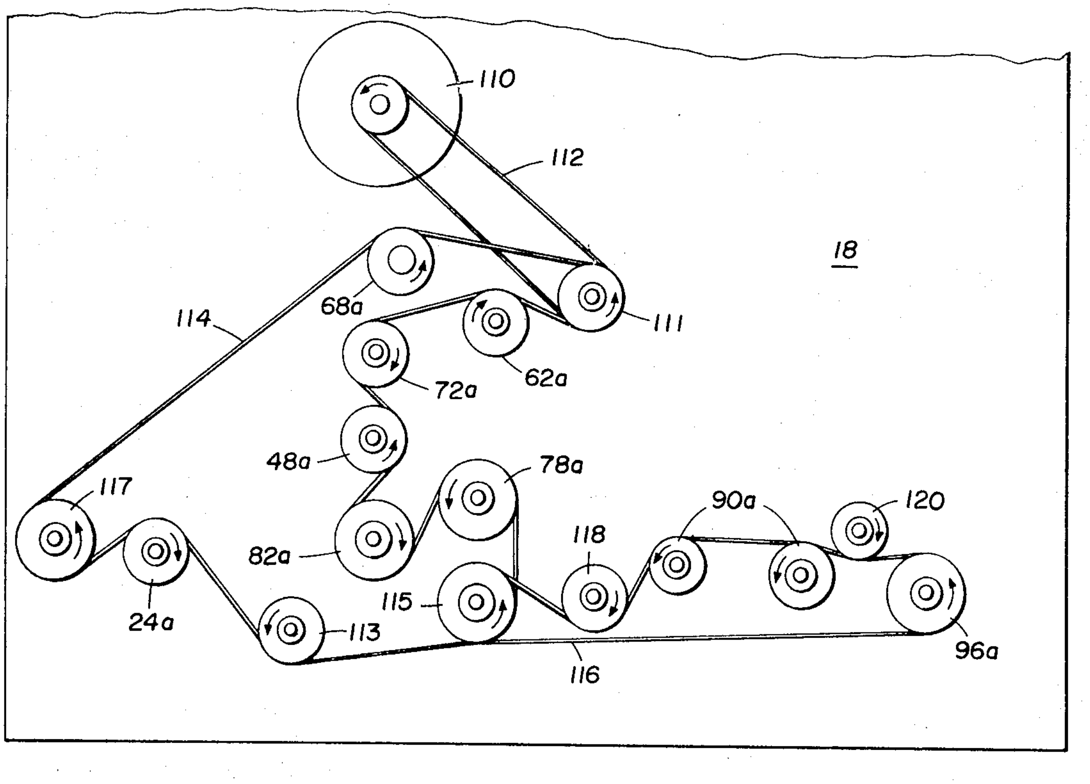
FIG. 2 is a view of the bottom of the apparatus of FIG. 1 and shows the drive mechanism for the apparatus.

As has been indicated throughout the description, the document is at all times under positive control of one or more drive wheels, except during the rest period awaiting the recirculate decision. Since, timing is critical, these drive wheels must all be driven at precisely the same speed, particularly since the document is traveling at a very high rate of speed. In FIG. 2, there is a view of the drive system for the various drive wheels whose driven ends extend beneath the table 18. The arrangement is such that the entire drive system is accomplished by using only three belts. These belts are of the timing belt variety containing lugs on one or both sides which engage in corresponding notches in the driven wheels thus eliminating any slippage. For purposes of clarity, each driven wheel contains the same reference numeral as its corresponding drive wheel, but the reference numeral is followed by the latter *a*. The main drive belt 112 connects the electronic motor 110 or other power source with the main drive pulley 111 which is a double-groove pulley. A drivebelt 114 has drive lugs on both sides and interconnects driven wheels **24*a*, 78*a*, 82*a*, 48*a*, 72*a*, 62*a* and 68*a*. Pulley 113 serves as a belt tightener and pulley 117 is an idler. Pulley 115 also is a double-groove pulley, and belt 114 is engaged in one of the grooves. The third drivebelt 116 is engaged with the second groove of pulley 115 and drives wheels 90*a*, 90*a* and 96*a*. Belt 116 contains driving lugs on one side only, and wheels 118 and 120 are idlers which serve as belt tighteners. With this arrangement, all of the document drive wheels are driven at precisely the same speed with the use of a minimum number of drive pulleys and belts. Obviously, other specific drive arrangements can also be employed, and the speed of the motor 110** can be varied to vary the speed of all the document drive wheels instantly and simultaneously.

The arrangement described thus far is designed primarily to handle cards or other relatively small documents. With appropriate modifications, the same basic design can be used, however, to handle larger sized documents. If large documents, such as sheets of relatively thin paper, are to be handled, the design shown in FIG. 5 may be used. FIG. 5 is a much simpler embodiment, but it does not include the recirculation feature of the embodiment of FIG. 1. The embodiment of FIG. 5 does, however, provide for reading of both sides of the document on a single pass of the document through the apparatus. The apparatus of FIG. 5 includes an input hopper 130 which has a movable input table 132 that supports a stack of documents to be fed into the machine. An input feed mechanism, indicated generally by the reference numeral 134 picks off a document on top of the stack and feeds it into the document reading portion of the apparatus. The input feed mechanism and input feed hopper can be of any number of well-known designs, and the specific construction of this input portion of the apparatus forms no part of the invention. A design appropriate for this use is disclosed in the copending patent application Ser. No. 669,457 filed on Sept. 21, 1957 by Everet F. Lindquist.

A document fed by the input feed mechanism 134 will be introduced into the wide throat 136 of the document reading portion of the apparatus. The throat 136 connects with an input path 138 defined by the lower side of a path divider 140, the function of which will be more fully described hereinafter. Once a document enters the path 138, it will become engaged by the drive wheel 142 and idler 144, which will continue to move the document past the reading head 146. When the leading edge of the document has passed the reading head 146, it will approach the junction of the turn around path 148 and the secondary input path 150. This junction is formed by reason of the path divider 152. Since the initial portion of the turn around path 148 is wider than the secondary input path 150, and because of the position of the path divider 152, the document will enter the turn around path 148 where it will become engaged by the drive wheel 154 and idler 156. The turn around plate 158 defines a circular path around the drive wheel 154, and once a document has completed its travel around the turn around path 148, it will enter the secondary input path 150 while still under control of the drive wheel 154. As a document enters the secondary input path 150, it will become engaged by the idler 160, and as the leading edge of the document leaves the secondary input path 150, it will again pass beneath the reading head 146 a second time. However, during this pass, the opposite side of the document will be presented beneath the reading head 146 for scanning.

As the leading edge of the document passes beyond the reading head 146, it will again be presented with the juncture of the first input path 138 and the discharge path 162 which is defined by the inverter plate 164. The juncture presented at this point to a document is provided by the path divider 140, and because of the position of the path divider 140, the leading edge of the document will be deflected by the path divider 140 into the final discharge path 162 at which time it will become engaged by the drive wheel 166 and the idler 144.

As shown in FIG. 5, a document will be conveyed along the discharge path 162 under control of successive drive wheels 168 and their respective idlers 170. The inverter plate 164 is formed so that the document will be inverted by the time it reaches the output hopper indicated generally by the reference numeral 172. The document discharged by the last drive wheel 168 will be discharged onto an output table 174 face down from the position that particular document was in the input hopper 130. Thus, the order of the documents will be maintained, which is extremely desirable. A document discharged by the final discharge drive wheel 168 will strike a suitable stop 176 so that the alignment of the documents will be maintained. The output table 174 is preferably movable up and down and will move downwardly as the height of the output stack increases. The details of the means for controlling movement of the output table 174 are not shown since various arrangements can be used and are well known to those skilled in the art and form no part of the invention.

Although not specifically shown in the drawings, the various drive wheels of the apparatus of FIG. 5 are driven at the same speed preferably by a drive arrangement similar to that shown in the first embodiment and illustrated in FIG. 2. This assures that all of the drive wheels will be driven at the same speed which is essential for proper movement of the documents through the apparatus. As in the first embodiment, the drive wheels are all driven from a power source such as an electric motor 178.

Also, in the apparatus of FIG. 5, the document is turned over in the opposite direction to that of the first embodiment in which the path is essentially a figure eight where the document crosses its own path twice in each recirculating cycle. On the other hand, in the embodiment of FIG. 5, a document travels through its path in two directions beneath the reading head 146, but it never crosses its own path. This variation is provided because the document reader of FIG. 5 has a wide input throat and not the knife edge throat of opening 33 as does the apparatus of the first embodiment. As previously explained, the knife edge of opening 33 will allow only one document at a time to pass into the reader. In the document reader of FIG. 5, however, occasionally two or more sheets will be fed in quick succession. This happens when there are foreign particles or sticky substances on one sheet so that it drags another sheet along close behind it. If the document path crossed itself, the leading sheet would collide with the second sheet causing a severe jam within the document path. Since the path does not cross itself, the possibility of a jam is minimized. In fact, a jam can occur in the second embodiment only if the leading edge of the first sheet is approaching the reading head 146 through path 150 at the exact instant the leading edge of the second sheet is approaching the reading head 146 through path 138 and if both lead edges are between the two path dividers 140 and 152 and beneath the reading head 146. Obviously, this is a very remote possibility, for if the lead edge of the first sheet had advanced as far as the final discharge path 162 at the same time the lead edge of the second sheet was emerging from the input path 138, no damage would be done as the sheets would merely rub against one another while going in opposite directions. The second sheet would, of course, not be read by the reading head 146, but no jam would occur. If desired, the logic of the machine can be designed to sense the trouble and shut the machine off.

A second possibility can occur in the second embodiment which would cause problems except for the design of the document path. If the electronics system that controls the input feed mechanism 134 should fail to raise itself up and away from the stack of sheets in the input hopper 130 after a sheet is fed into the throat 136, several sheets can be fed into the machine in an overlapped condition with the leading edge portion of the second sheet under the trailing edge portion of the first sheet, etc. This burst of overlapped sheets will be conveyed through the reader of FIG. 5 without jamming because of the looped turnover document path. However, this would not be possible in the crossover document path used in the reader of the first embodiment.

The arrangement of the second embodiment, of course, utilizes the principles of the invention but applies them to an apparatus for handling larger documents. Obviously, if it were deemed desirable to include in such an apparatus a recirculation feature such as that described in connection with the first embodiment, the proper control means could be included in the apparatus. However, for purposes of simplicity, this feature has not been included in the second embodiment.

The above described embodiments, although extremely simple, provide a very effective method of permitting both sides of a document to be read in a single pass through the document scanner. Furthermore, the arrangements provide for a recirculation feature which is highly desirable in some applications. Using the arrangements and the method of the invention, all the documents can be completely read on both sides by a single reading head, thus eliminating the necessity of manually removing the documents from the output hopper and returning them to the input hopper for a second pass through the apparatus. The invention thus permits greater automation in document reading and requires less attention and observation by an operator. With the proper associated control means, the arrangement and method can also largely eliminate the necessity of rereading or manually reading individual documents where the control means detects erroneous information.

It will be obvious to those skilled in the art that although only a single preferred embodiment of the invention has been described herein, many variations and modifications can be made in the specific apparatus without departing from the spirit and scope of the invention. It is my intention, however, that all such revisions, modifications and variations as are obvious to those skilled in the art will be included within the scope of the following claims.

I claim:

1. A high-speed document reader for rapidly and consecutively reading documents each containing data on both its faces, said document reader comprising reading means responsive to the data on said document, input storage means for temporarily storing in a stack a plurality of documents to be fed to said reading means, means for consecutively feeding individual documents from said input storage means, means defining a feed path to guide a document from said input storage means and present a first face of said document to said reading means, path divider means defining an inverting path for guiding each document without interrupting its movement from said feed path and returning it to said reading means with the other of its faces presented to said reading means, said path divider means defining an inverting path with outgoing and return portions that diverge from a point beneath said reading means, the length of said inverting path being at least as long as the dimension of said document from its leading edge to its trailing edge, output storage means for receiving and stacking documents both faces of which have been read by said reading means, means defining a discharge path from said reading means to said output storage means for receiving a document from said inverting path, said discharge path and feed paths not crossing each other and diverging from a point in the document path beneath said reading means, the height of the document path beneath said reading means being sufficient to allow the simultaneous passage of two documents beneath said reading means, and drive means in continuous driving engagement with each document for positively conveying said document continuously through said paths from said input storage means to said output storage means.

2. The document reader of claim 1 in which said path divider means includes a diverging member presented to the leading edge of a document leaving the feed path, said member defining the inlet and outlet to said inverter path and causing a document leaving said feed path to be diverted into the said inlet.

3. The document reader of claim 2 in which a document entering the inlet of said inverting path does not cross the path of a document leaving the outlet of said inverting path.

4. The document reader of claim 3 in which said drive means includes a plurality of drive wheels located along said path and engaging the documents passing through said paths, said drive wheels being driven at the same speed and located along said paths so that at least one of said drive wheels is engaged with a document at all times.

5. The document reader of claim 4 in which a single drive wheel conveys a document through said inverting path.

* * * * *